April 14, 1970   S. L. SNYDER   3,506,225
OPENING SHOCK INHIBITOR FOR PARACHUTES
Filed Oct. 15, 1968   4 Sheets-Sheet 1

Stephen L. Snyder
INVENTOR.
BY
Attorneys

April 14, 1970     S. L. SNYDER     3,506,225
OPENING SHOCK INHIBITOR FOR PARACHUTES
Filed Oct. 15, 1968     4 Sheets-Sheet 2
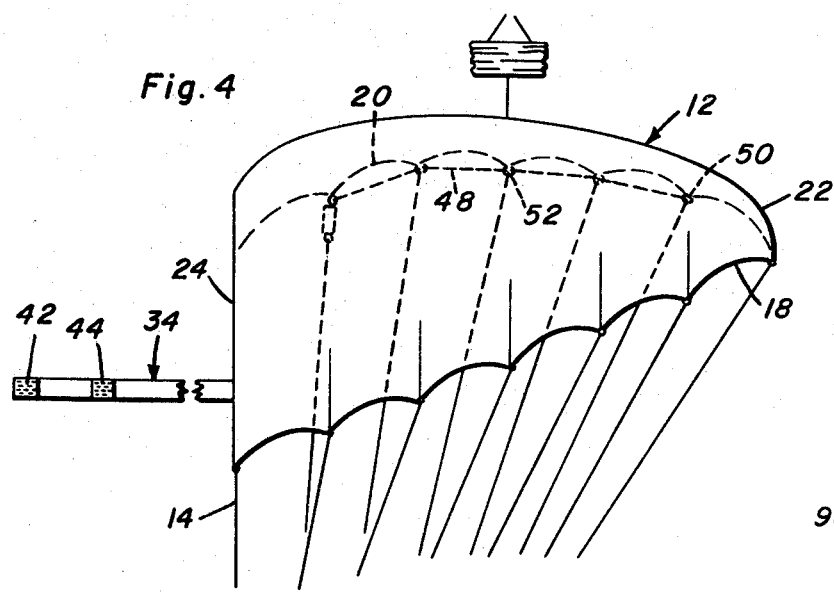
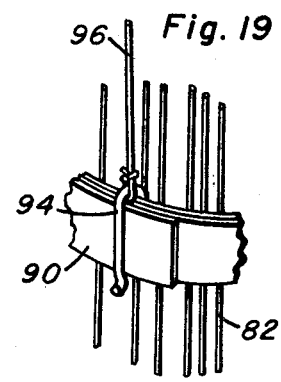
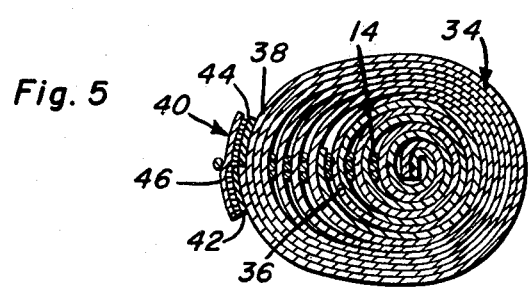
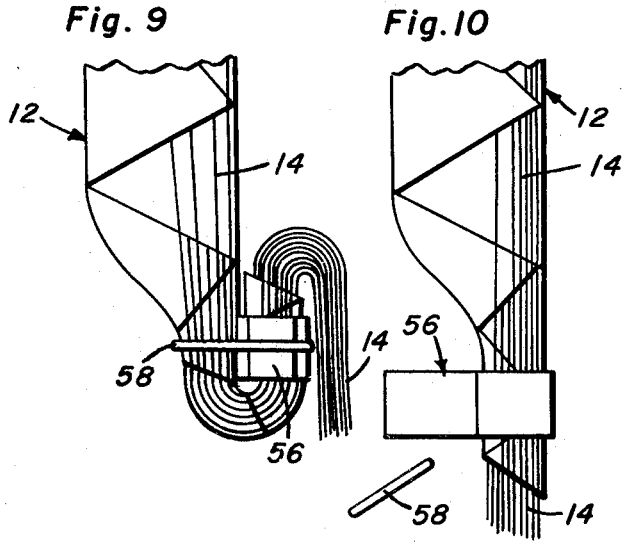
Stephen L. Snyder
INVENTOR.

April 14, 1970 S. L. SNYDER 3,506,225
OPENING SHOCK INHIBITOR FOR PARACHUTES
Filed Oct. 15, 1968 4 Sheets-Sheet 3
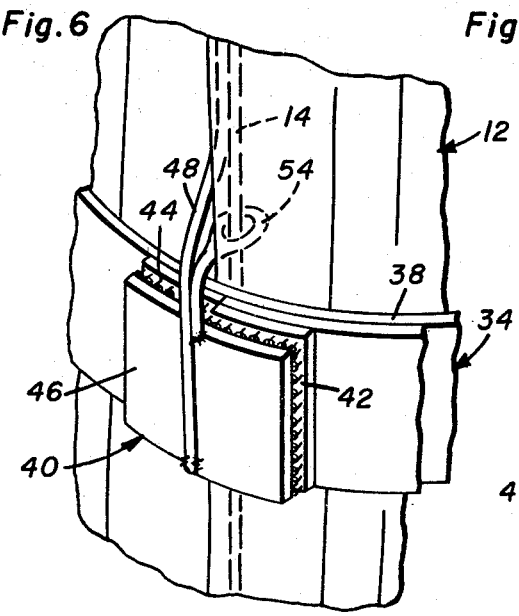
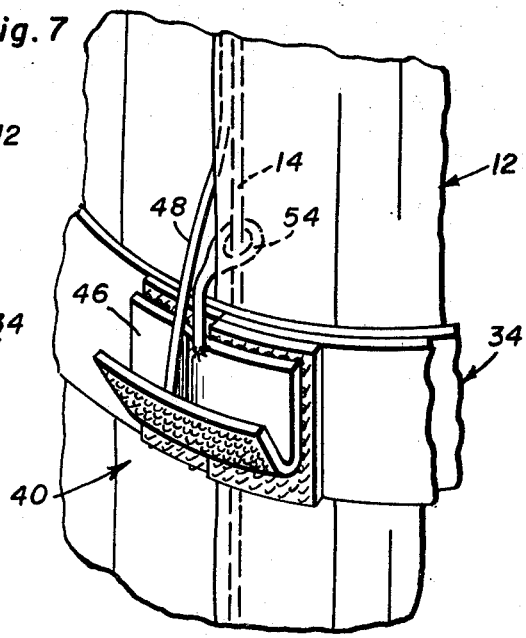
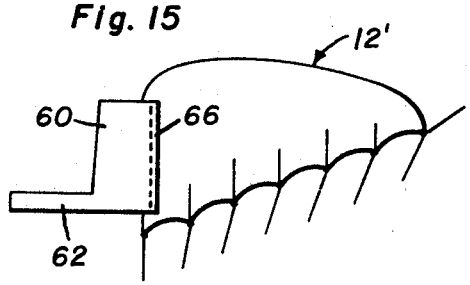
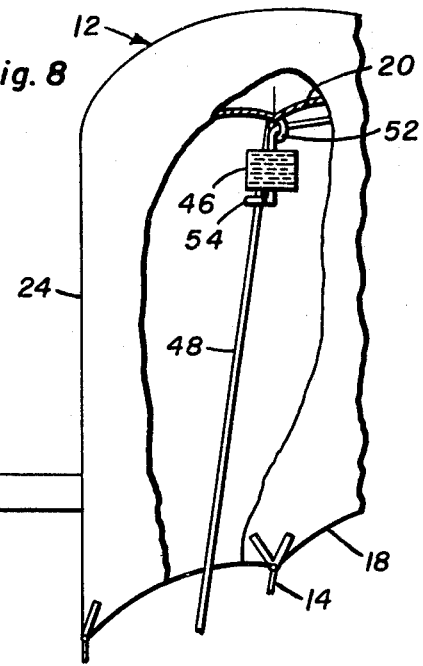
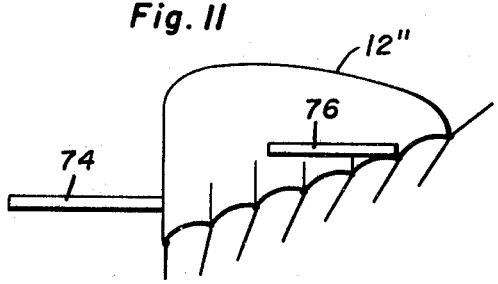
Stephen L. Snyder
INVENTOR.
BY Clarence A. O'Brien
and Harvey B. Jacobson
Attorneys April 14, 1970 S. L. SNYDER 3,506,225
OPENING SHOCK INHIBITOR FOR PARACHUTES
Filed Oct. 15, 1968 4 Sheets-Sheet 4

Stephen L. Snyder
INVENTOR.

BY
*Attorneys*

United States Patent Office 3,506,225
Patented Apr. 14, 1970

3,506,225
OPENING SHOCK INHIBITOR FOR
PARACHUTES
Stephen L. Snyder, 331 Cherry Hill Blvd.,
Cherry Hill, N.J. 08034
Filed Oct. 15, 1968, Ser. No. 767,717
Int. Cl. B64d 17/36
U.S. Cl. 244—149
20 Claims

ABSTRACT OF THE DISCLOSURE

Opening of parachutes made of relatively non-porous material is restricted and delayed in order to reduce shock on the load suspended from the inflating canopy. One or more reefer straps are secured at fixed locations to the canopy and/or the load lines and wrapped thereabout so as to slowly unwind after the canopy is released from its enclosure and the load lines are deployed. Unwrapping of the reefers delays inflation of the canopy to regulate opening shock.

---

This invention relates to parachutes in general and more particularly to regulated opening or inflation of parachutes of different types.

A serious problem has arisen in connection with the opening of parachutes particularly those that open "hard" because of their configuration and/or material porosity. Such parachutes when released from the enclosure whether it be a pack, a bag or sleeve, open rather abruptly to decelerate a falling load suspended from the parachute canopy. The shock imposed thereby on the load may be too severe causing damage. This opening shock problem is particularly aggravated when the parachute is opened after prolonged free fall of the load, since the load would then be decelerated after attaining a very high speed. Unless some facility is provided to reduce the severity of the opening shock of the parachute, the advantages obtained from gliding or controlled descent parachutes would be made impracticable.

It is therefore an important object of the present invention to provide a relatively simple, inexpensive yet reliable means for regulating and/or reducing the opening shock of a parachute.

In accordance with the present invention, various reefing techniques are utilized to reduce the extent to which the canopy is opened within a given time utilizing an elongated fabric strap or flap of a fixed or predetermined length which is wrapped about the parachute in its folded condition, the strap or flap unwinding from a fixed location on the canopy and/or load line following release of the folded parachute from its enclosure to thereby restrict inflation of the canopy and control inflation thereof in stages. The foregoing reefing technique is applicable to different types of parachutes including the usual hemispherical type as well as flexible airfoil types by means of which descent is controlled. One or more reefing straps are secured or sewn to the parachute material at such fixed locations and wrapped thereabout in order to regulate unfolding and inflation of the parachute canopy in accordance with the length of the straps or the time it takes the straps to completely unwind.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a partial side elevational view showing the parachute in a fully inflated condition.

FIGURE 5 is an enlarged transverse sectional view taken substantially through a plane indicated by section line 5—5 in FIGURE 2.

FIGURE 6 is an enlarged partial perspective view showing a reefer holding device.

FIGURE 7 is a partial perspective view showing the reefer holding device of FIGURE 6 being released.

FIGURE 8 is an enlarged partial side elevational view of the parachute in a fully inflated condition with parts broken away to show the disposition of the reefer holding device.

FIGURE 9 is a partial side elevational view illustrating another type of reefer holding device.

FIGURE 10 is a side elevational view showing the reefer holding device of FIGURE 9 released.

FIGURE 11 is a simplified side elevational view of a fully opened parachute showing a somewhat different reefing arrangement.

FIGURES 12, 13, 14 and 15 are side elevational views showing yet another reefing arrangement in different operational stages.

FIGURE 19 is an enlarged detail view showing the releasable holding device associated with the reefing arrangement of FIGURES 16 and 17.

Figure 1:
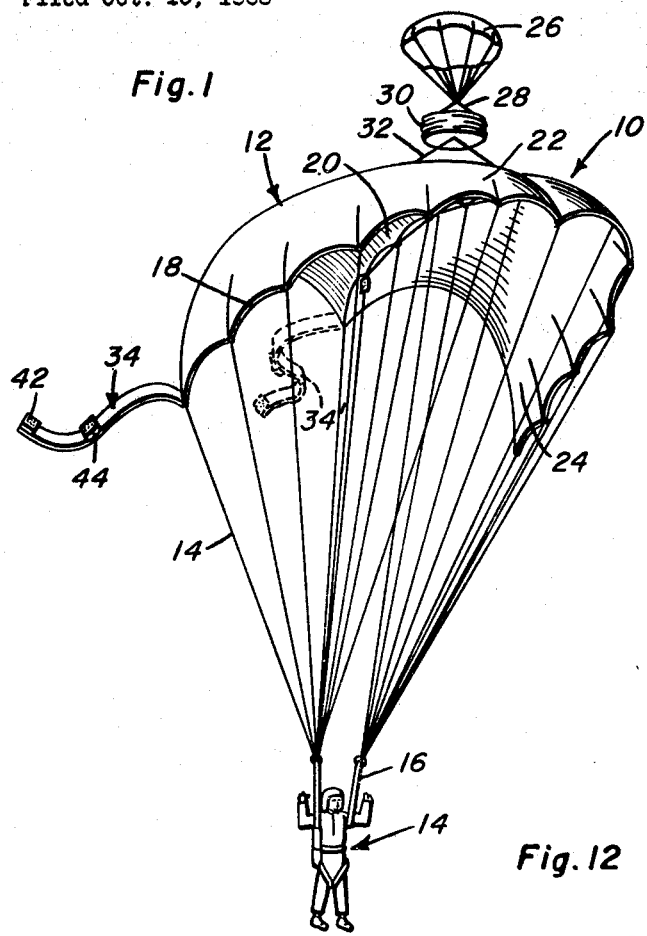
FIGURE 1 is a perspective view showing one type of parachute with which the reefing technique of the present invention is associated, the parachute being shown in a fully inflated condition.

Referring now to the drawings in detail, FIGURE 1 illustrates by way of example a controllable type of parachute 10 to which the present invention is applied. This type of parachute sometimes referred to as a "parawing" when inflated defines a lift producing airfoil in longitudinal section through the canopy 12 so that the load 14 suspended by the suspension load lines 14 and riser straps 16 from the canopy will glide along a path of descent at an angle to the vertical. In the example illustrated in FIGURE 1, the canopy is of the single keel type, the inflated shape of which is controlled by the relative lengths of the suspension lines 14 secured to the peripheral side edges 18 and the keel line 20 extending between the forward nose portion 22 and the trailing edge 24. Further, in the illustrated embodiment of FIGURE 1, a pilot chute 26 is deployed secured by the bridle lines 28 to the top of a bag type enclosure 30 from which the canopy is released. Retainer lines 32 interconnect the bag and pilot chute with the apex portion of the canopy 12.

Figure 2:
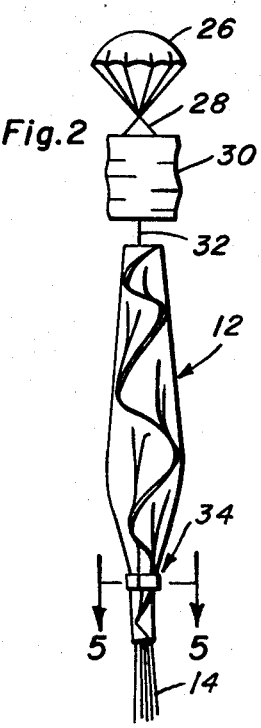
FIGURE 2 is a partial side elevational view of the parachute shown in FIGURE 1 in an initial stage of opening following release of the parachute from its enclosure.

The canopies of parachutes such as the type described are made of a relatively low porosity material so as to maintain higher gliding efficiency during the entire descent. However, because of the non-porous nature of the material, inflation of the parachute canopy is more rapid resulting in severe shock on the load suspended by the parachute whether it be a human being or inanimate equipment. Inflation of the parachute after release from its enclosure must therefore be regulated in order to reduce opening shock. Toward this end, a fabric reefer strap or flap 34 as shown by solid line in FIGURE 1 is utilized. In the illustrated embodiment of FIGURE 1, the reefer strap 34 is secured as by stitching to the trailing edge 24 adjacent to the peripheral edge 18. This reefer strap may of course be placed at other fixed locations on the canopy such as indicated by the strap 34' shown in dotted line adjacent to the keel line 20. The reefer strap 34 as shown in FIGURE 1 is of course inoperative since the parachute is in its fully opened condition. In the folded condition of the canopy however, within its enclosure, whether it be the bag 30 or a conventional parachute pack, the reefer strap 34 is wrapped around a portion of the canopy. Thus, when the folded canopy 12 is released from its enclosure 30 and the load lines 14 are deployed as shown in FIGURE 2, the extent to which the canopy may be inflated is reduced because of its confinement by the reefer strap 34 wrapped thereabout. The canopy will therefore be restrictively inflated, inflation progressing more slowly than would ordinarily be the case as the reefer strap 34 unwinds as shown in FIGURE 3 wherein the canopy 12 is partially inflated.

Figure 3:
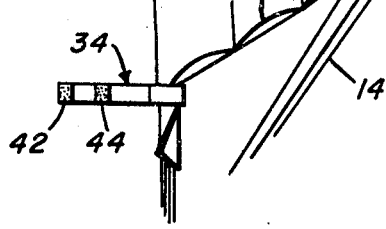
FIGURE 3 is a side elevational view showing the parachute of FIGURES 1 and 2 in a partially inflated condition.

Referring now to FIGURES 2, 3 and 5, it will be observed that the reefer strap 34 forms a plurality of turns when wrapped about the folded canopy. In one application of the invention as illustrated, the radially inner turns of the reefer strap constitute secondary hesitation turns 36 in that they confine therebetween sets of three load lines 14 which extend in alignment from the center keel 20 and the opposite sides of peripheral edge 18. These secondary turns of the reefer strap therefore may progressively release the load lines in any sequence in order to reduce by stages the extent to which the parachute opens. The secondary turns 36 of the reefer strap unwind however only after the radially outer primary timing turns unwind from the canopy. Thus, inflation of the canopy is regulated in stages as shown by the opening sequence of FIGURES 2, 3 and 4.

The effectiveness of the reefer strap in delaying complete inflation and opening of the parachute, is enhanced by preventing unwrapping or unwinding of the strap until inflation of the canopy has begun. A releasable holding device generally referred to by reference numeral 40 may therefore be associated with the reefer strap as shown in FIGURES 5, 6 and 7. The holding device includes "Velcro" fabric fastener portions 42 and 44 mounted on one side of the strap. The fabric fastener portion 42 is mounted on the end of the strap while the other fastener portion 44 is spaced therefrom a distance substantially equal to the length of a primary turn of the strap so that the two fastener portions 42 and 44 will be disposed in spaced adjacency to each other when the strap is completely wrapped. A mating "Velcro" fastener panel 46 bridges the fastener portions 42 and 44 as shown in FIGURES 5 and 6 in order to prevent the strap from unwrapping or unwinding. A release line 48 is secured to the lower edge of the fastener panel 46 in order to peel off the panel as shown in FIGURE 7 thereby releasing the holding device 40 so that the reefer strap may unwind.

The release line 48 is associated with a releasing mechanism which includes an anchor 50 on the keel line 20 adjacent the nose portion 22 of the canopy as shown by dotted line in FIGURE 4. The release line extends from the anchor 50 through guide rings 52 as shown in FIGURES 4 and 8, the guide rings 52 being secured to the keel line 20. Thus, the release line 48 extends downwardly from the rearmost guide ring 52 toward the holding device 40 on the reefer strap. The fastener panel 46 of the holding device is provided with a guide projection 54 through which a central suspension line 14 extends for guiding movement of the fastener panel to a retracted position as illustrated in FIGURE 8 corresponding to a fully inflated canopy. It will be apparent, that inflation of the canopy to some extent will cause displacement of the anchor 50 so as to exert a pull on the release line 48 thereby withdrawing the fastener panel 46 from the holding device to release the reefer strap for unwinding.

FIGURES 9 and 10 illustrate another form of releasable holding arrangement for a reefer strap 56 which is similar to the reefer strap 34 except that it does not have any holding device 40. Instead, the lower portion of the folded canopy 12 is folded over as shown in FIGURE 9 and a rubber band 58 is placed about the strap 56 and the adjacent portion of the folded canopy. The folded over portion of the canopy is thereby unfolded in response to tension applied to the suspension load lines 14 to eject the rubber band 58 as shown in FIGURE 10. Unwinding of the reefer strap 56 is then permitted. Thus, the reefer strap 56 is released for unwinding in response to tension applied to the suspension load lines as distinguished from partial opening of the canopy in response to which the holding device 40 is released as described in connection with FIGURES 2 through 8.

Figures 12, 13, 14:
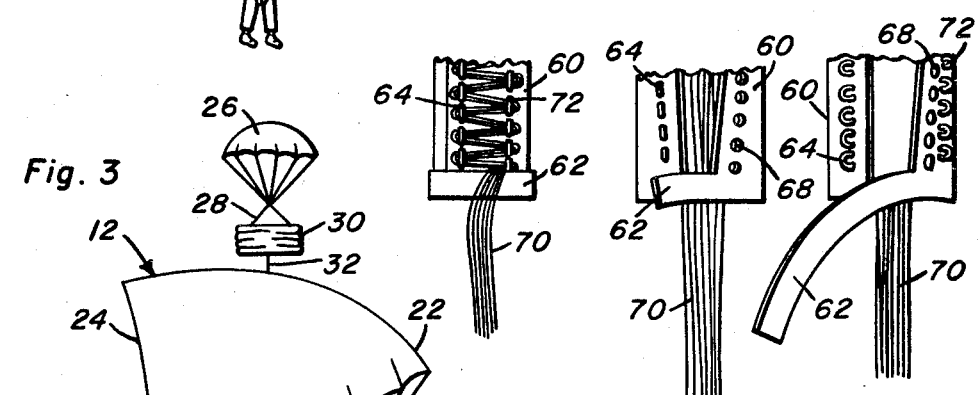

The reefer strap hereinbefore described was independent of the enclosure within which the folded parachute is confined prior to opening of the enclosure and release of the parachute therefrom. One type of known enclosure includes a fabric sleeve encircling the folded canopy. Thus, the reefer strap may be associated with a sleeve type enclosure which is secured as by stitching directly to the canopy of the parachute, so that the reefer strap may control release of the parachute from the enclosure in order to reduce opening shock. FIGURE 15 shows this type of reefing arrangement for modified form of canopy 12', including a fabric panel 60 secured as by stitching 66 adjacent the trailing edge. The reefer strap 62 extends from the lower portion of the panel 60 in the unraveled condition as shown in FIGURE 15 wherein the canopy 12' is in its fully inflated condition. The panel 60 is provided with two series of spaced rubber bands 64 and 72 secured to the panel, as shown in FIGURE 14. Reinforced holes 68 are formed in the panel 60 adjacent its free edge. As shown in FIGURE 12, the panel 60 is wrapped around the parachute canopy so as to form an enclosing sleeve, the sleeve being held in encircling relation to the folded canopy by stowing the load lines 70 interengaged in a manner well known in the art between the rubber bands 64 projecting through the reinforced openings 68 and the rubber bands 72. Downward tension exerted on the lines 70 by deployment of the parachute would normally cause release of the canopy from the sleeve enclosing panel 60 except that the lower portion of the sleeve forming panel 60 is still enwrapped by the reefer strap 62. Thus, the reefer strap then unwinds as shown in FIGURE 13. When the reefer strap is completely unwound, as shown in FIGURE 14, full inflation of the canopy ensues.

Although a single reefer strap has been described in connection with the previously described embodiments of the invention, it should be appreciated that more than one reefer strap may be employed and secured to the parachute canopy at different locations. Thus, as shown in FIGURE 11, a reefing arrangement is shown wherein reefer straps 74 and 76 are respectively secured to the canopy 12" at the trailing edge and intermediate the trailing edge and the nose portion of the canopy. The reefer straps may be made of different lengths so that when unwinding they release the canopy in stages for progressive inflation to the fully inflated condition of the canopy as shown in FIGURE 11.

Figure 16:
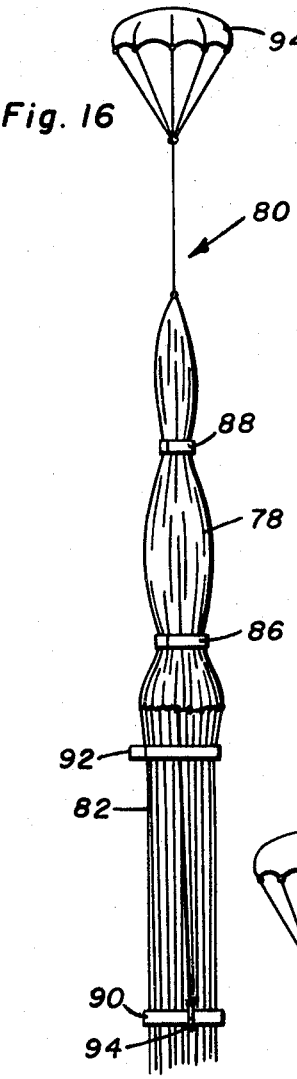
FIGURES 16, 17 and 18 are partial side elevational views of still another reefing arrangement associated with a hemispherical type of parachute.
Figure 17:
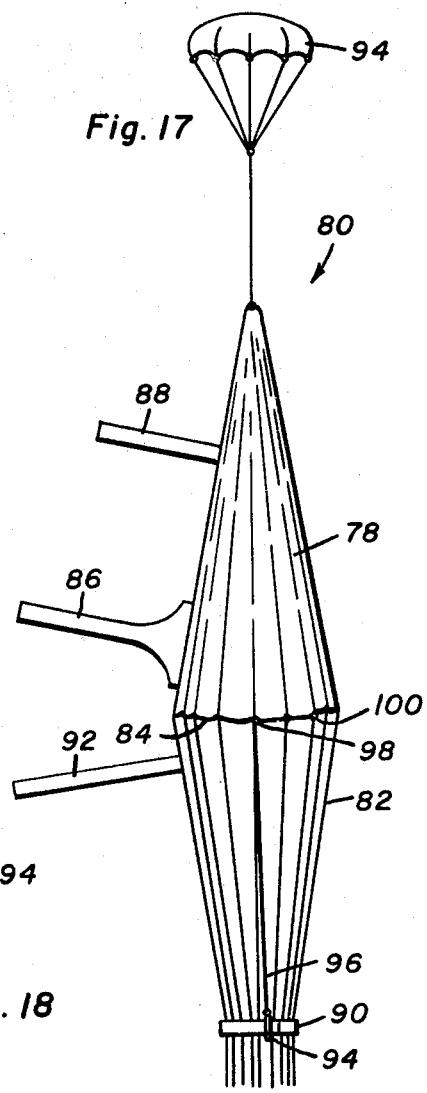
Figure 18:
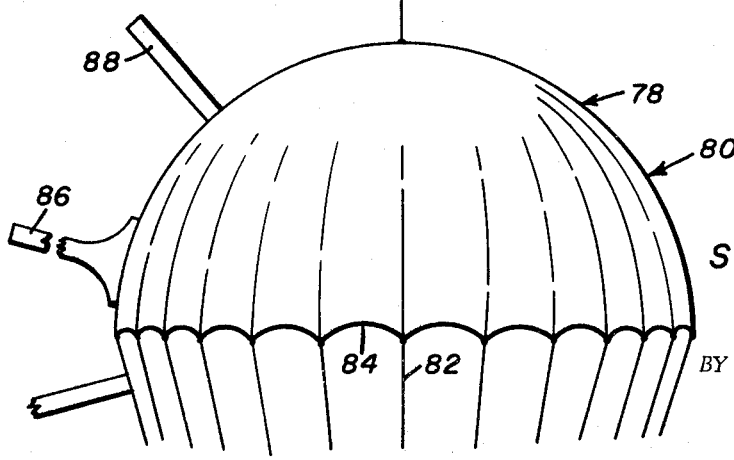

It should be appreciated also, that the reefing technique of the present invention is applicable to parachutes of different shapes. FIGURE 18 by way of example illustrates a reefing arrangement applied to a hemispherical type of canopy 78 associated with parachute 80 having load suspension lines 82 extending from the circumferential peripheral edge 84 of the canopy. In this reefing arrangement, reefer straps 86 and 88 are secured to the canopy at radially spaced locations for progressive release of the canopy. Also, reefer straps 90 and 92 are secured to the suspension lines 82 as shown in FIGURE 16 illustrating the parachute 80 in its initially released condition with the suspension lines and the pilot chute 94 deployed. It will be apparent from FIGURE 17, that the canopy is progressively released by unwinding of the reefer straps 88 and 86 followed by unwinding of the reefer strap 92 releasing the upper portions of the suspension lines 82. Release of the lower reefer strap 90 on the other hand may be delayed by a releasable holding clip 94 shown in detail in FIGURE 19. The holding clip is released in response to partial opening of the canopy 78 and toward this end, the holding clip is secured to the lower end of a release line 96 extending through guide rings 98 secured to the peripheral edge 84 of the canopy. The end of the release line opposite the holding clip is secured to the edge of the canopy at anchor 100 so that partial inflation of the canopy will upwardly withdraw the holding clip by tensioning the release line 96 to permit final unwinding of the lowermost reefer strap 90 from the load lines 82. It should be apparent from the latter described embodiment that the present invention also contemplates attaching of one or more reefer straps either to the canopy alone, the load lines alone as well as in combination with each other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a parachute having a flexible canopy adapted to be inflated when released in folded condition from an enclosure and load suspension lines connected to the canopy released therewith from the enclosure, an opening shock inhibitor comprising elongated reefing means wrapped by plural continuous turns about the parachute in the folded condition thereof within the enclosure, and means mounting the reefing means on the parachute for sequential unwrapping of said turns therefrom following said release of the canopy from the enclosure and deployment of the load suspension lines to retard inflation of the canopy.

2. The combination of claim 1 wherein said reefing means includes at least one flap encircling the folded canopy several turns.

3. In combination with a parachute having a flexible canopy adapted to be inflated when released in folded condition from an enclosure and load suspension lines connected to the canopy released therewith from the enclosure, an opening shock inhibitor comprising elongated reefing means wrapped about the parachute in the folded condition thereof within the enclosure, and means securing the reefing means to the parachute at a fixed location thereon for unwrapping therefrom in delayed response to said release of the canopy from the enclosure and deployment of the load suspension lines to retard inflation of the canopy, said reefing means including at least one flap encircling the folded canopy several turns, at least some of the suspension lines being entrapped between the turns of the flap.

4. The combination of claim 3 wherein said securing means includes a sleeve-forming panel enclosing the canopy, said flap extending from the panel.

5. The combination of claim 2 wherein said securing means includes a sleeve-forming panel enclosing the canopy, said flap extending from the panel.

6. The combination of claim 1 wherein said securing means including a sleeve-forming panel enclosing the canopy.

7. The combination of claim 2 including releasable holding means preventing unwrapping of the flap from the canopy, and automatic means for releasing the holding means.

8. The combination of claim 7 wherein said automatic means is responsive to tension in the load lines.

9. In combination with a parachute having a flexible canopy adapted to be inflated when released in folded condition from an enclosure and load suspension lines connected to the canopy released therewith from the enclosure, an opening shock inhibitor comprising elongated reefing means wrapped about the parachute in the folded condition thereof within the enclosure, means securing the reefing means to the parachute at a fixed location thereon for unwrapping therefrom in delayed response to said release of the canopy from the enclosure and deployment of the load suspension lines to retard inflation of the canopy, releasable holding means preventing unwrapping of the flap from the canopy, and automatic means for releasing the holding means, said automatic means being responsive to partial inflation of the canopy.

10. The combination of claim 9 wherein said holding means includes fastener fabric portions mounted in spaced relation on the flap to be in close adjacency to each other when the flap is wrapped about the canopy, and a mating fastener fabric panel bridging the fastener fabric portions.

11. The combination of claim 10 wherein said releasing means includes a release line conencted to the fabric panel, means anchoring the release line to the canopy, and guide means secured to the canopy through which the release line extends to the flap from the anchoring means.

12. The combination of claim 11 including a plurality of said flaps, each of the flaps being of a different length and secured at a different location to the canopy to progressively unwrap from the canopy.

13. The combination of claim 11 wherein said parachute is of the controllable descent type, the canopy having a forward nose portion and a trailing edge, said flap being secured to the trailing edge.

14. In combination with a parachute having a flexible canopy and load suspension lines connected to the canopy, an opening shock inhibitor including elongated reefing flap means secured to the parachute at a fixed location thereon and wrapped thereabout for restricting inflation of the canopy, said flap means including a plurality of turns adapted to unwrap sequentially from the parachute to delay complete inflation of the canopy in accordance with the length of the flap means following deployment of the load suspension lines.

15. The combination of claim 14 including releasable holding means preventing unwrapping of the flap means, and means responsive to tension in the load lines for releasing the holding means.

16. The combination of claim 15 wherein said flap means includes one strap element secured to one of the load lines and at least another strap element secured to the canopy.

17. The combination of claim 14 wherein said flap means includes one strap element secured to one of the load lines, and at least another strap element secured to the canopy.

18. The combination of claim 14 wherein said flap means includes at least one strap element secured to the canopy.

19. The combination of claim 14 wherein said flap means includes at least one strap element secured to one of the load lines.

20. In combination with a folded parachute having a canopy made of flexible material and a plurality of load suspension lines connected thereto, an opening shock inhibitor comprising at least one continuous flexible reefing element having separated ends, means releasably mounting said reefing element in encircling relation to the folded parachute by more than one turn for sequential unwrapping therefrom to reduce the rate at which the canopy inflates as a function of the reefing element length, said reefing element being of a predetermined unwrapped length between said ends to encircle the folded parachute by said more than one complete turn.

References Cited

UNITED STATES PATENTS 2,391,262  12/1945  Monks _____ 244—142

FOREIGN PATENTS 776,296  6/1957  Great Britain.

OTHER REFERENCES

Report on the works of the "Parachute Department," by Prof. Madelung, No. F–Su–1107–ND, pp. 26–28, May 20, 1946, Headquarters Air Materiel Command, Wright Field, Dayton, Ohio.

MILTON BUCHLER, Primary Examiner

J. E. PITTENGER, Assistant Examiner